(12) United States Patent
Line et al.

(10) Patent No.: US 8,702,053 B2
(45) Date of Patent: Apr. 22, 2014

(54) VEHICLE SEAT INTERFACE ASSEMBLY

(75) Inventors: Johnathan Andrew Line, Northville, MI (US); Majid Arefi, West Bloomfield, MI (US); Michael Medoro, Northville, MI (US); Khaled Ayyash, Ann Arbor, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 13/116,637

(22) Filed: May 26, 2011

(65) Prior Publication Data

US 2012/0299352 A1    Nov. 29, 2012

(51) Int. Cl.
*B60N 2/00*    (2006.01)

(52) U.S. Cl.
USPC .............. 248/503.1; 248/424; 297/344.1

(58) Field of Classification Search
USPC ......... 248/424, 429, 500, 503, 503.1, 221.12; 297/344.1, 344.11
See application file for complete search history.

(56) References Cited

U.S. PATENT DOCUMENTS

| | | | |
|---|---|---|---|
| 3,854,192 A | 12/1974 | O'Konski | |
| 5,083,726 A * | 1/1992 | Schurr | 244/118.6 |
| 5,221,585 A | 6/1993 | Kresse, Jr. et al. | |
| 5,489,172 A * | 2/1996 | Michler | 410/105 |
| 5,871,318 A * | 2/1999 | Dixon et al. | 410/105 |
| 5,921,606 A * | 7/1999 | Moradell et al. | 296/65.03 |
| 5,944,388 A * | 8/1999 | Saucier et al. | 297/440.1 |
| 6,131,286 A | 10/2000 | Kelly et al. | |
| 6,135,666 A | 10/2000 | Kelly et al. | |
| 6,241,144 B1 | 6/2001 | Mandon | |
| 7,044,677 B2 | 5/2006 | Moser et al. | |
| 7,390,063 B2 | 6/2008 | Behrens | |
| 8,182,183 B2 * | 5/2012 | Cook et al. | 410/105 |
| 2010/0194170 A1 | 8/2010 | Muhlenbrock | |

* cited by examiner

*Primary Examiner* — Steven Marsh
(74) *Attorney, Agent, or Firm* — Vichit Chea; Price Heneveld LLP

(57) ABSTRACT

A vehicle seat interface assembly having a track including a web having a substantially uniform thickness and one of a key and a key slot. A seat bracket is operably connected with a vehicle seat. The seat bracket includes a support that has the other of the key and the key slot disposed thereon. The key includes first and second side portions. The space defined between the first side portion and the support is greater than the thickness of the web. The space defined between the second side portion and the support is less than the thickness of the web, such that the key may be inserted into the key slot and laterally translated until the web is frictionally secured between the second side portion and the support.

19 Claims, 7 Drawing Sheets

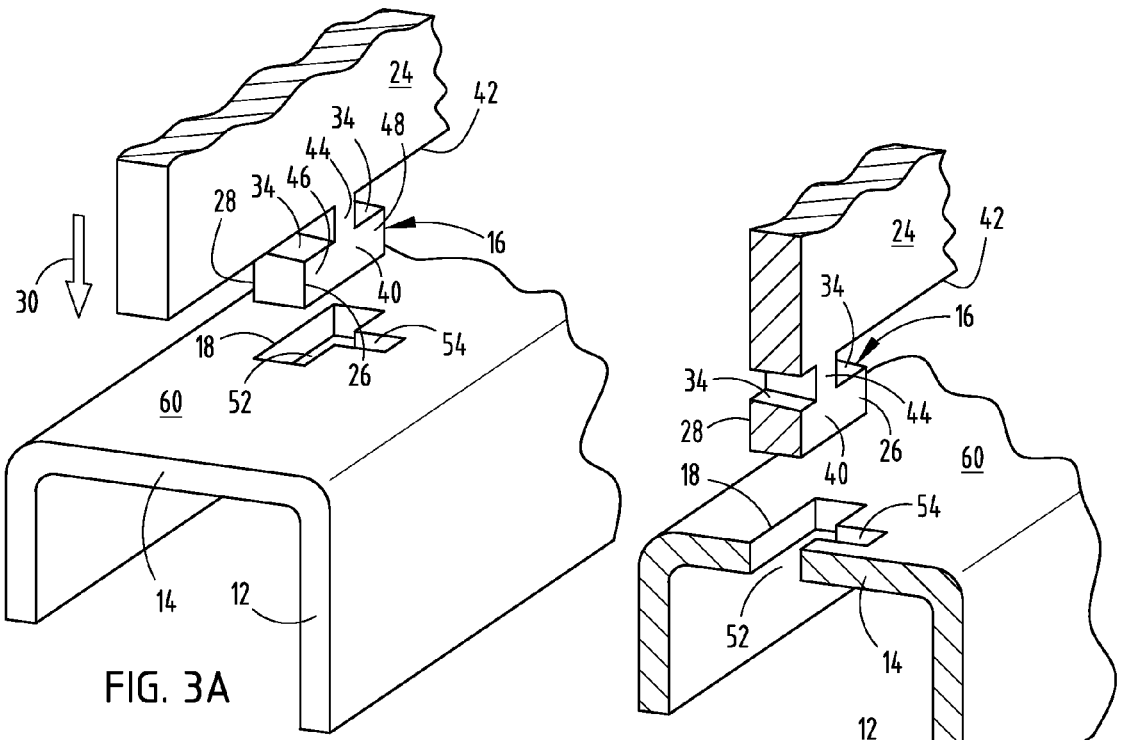
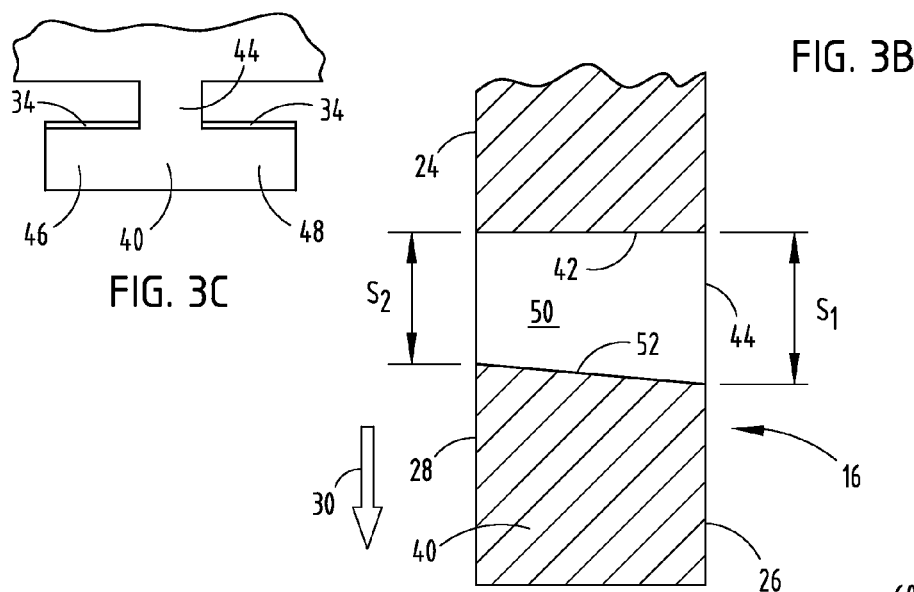
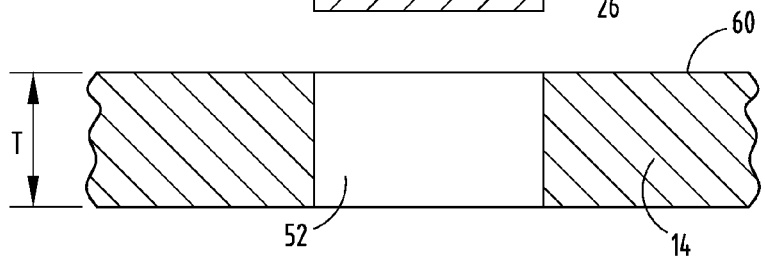
FIG. 3A
FIG. 3B
FIG. 3C
FIG. 3D

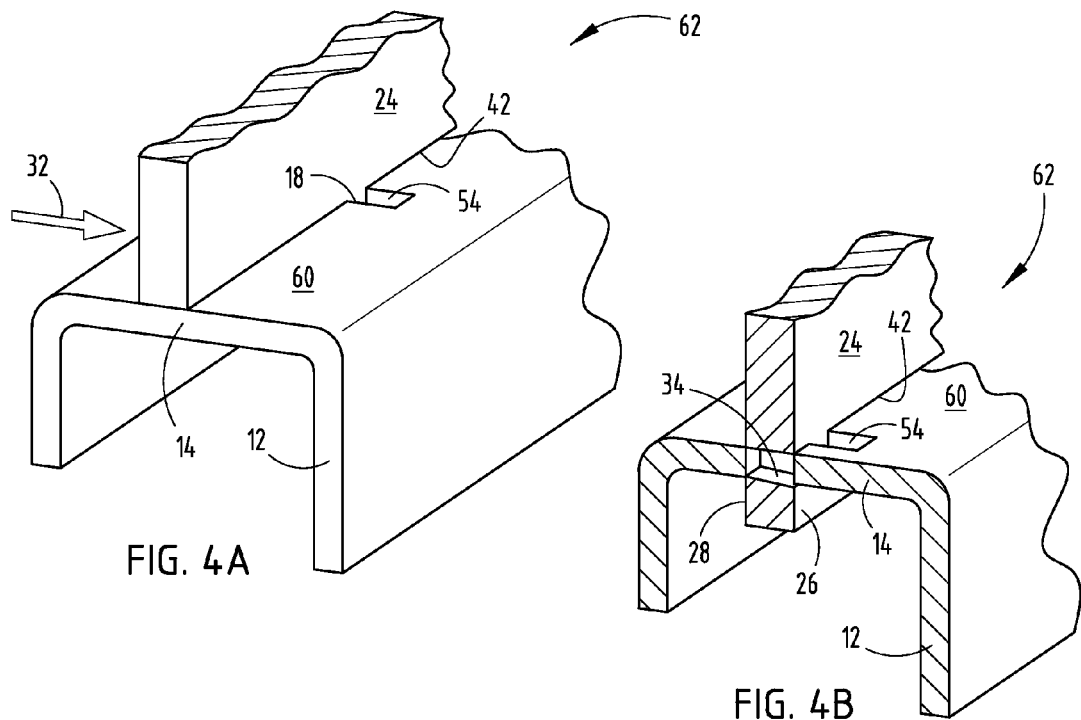
FIG. 4A
FIG. 4B
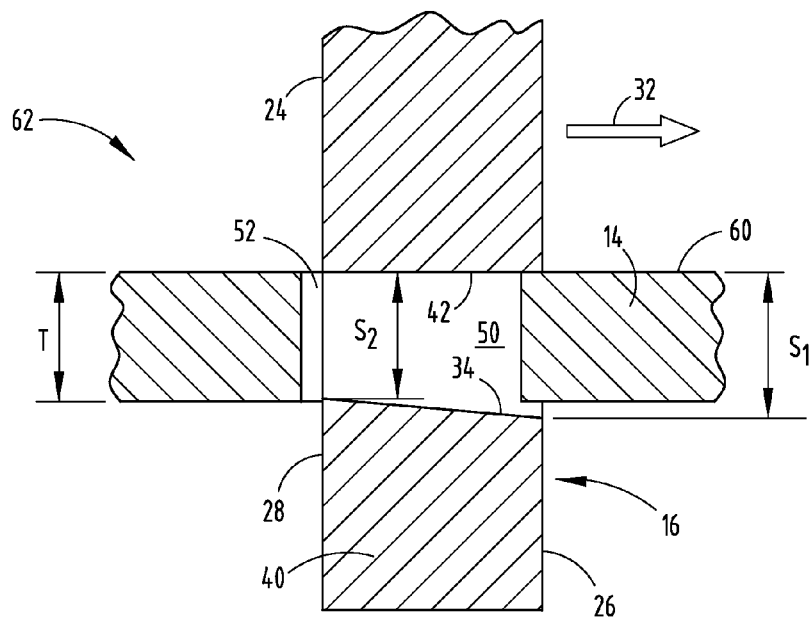
FIG. 4C

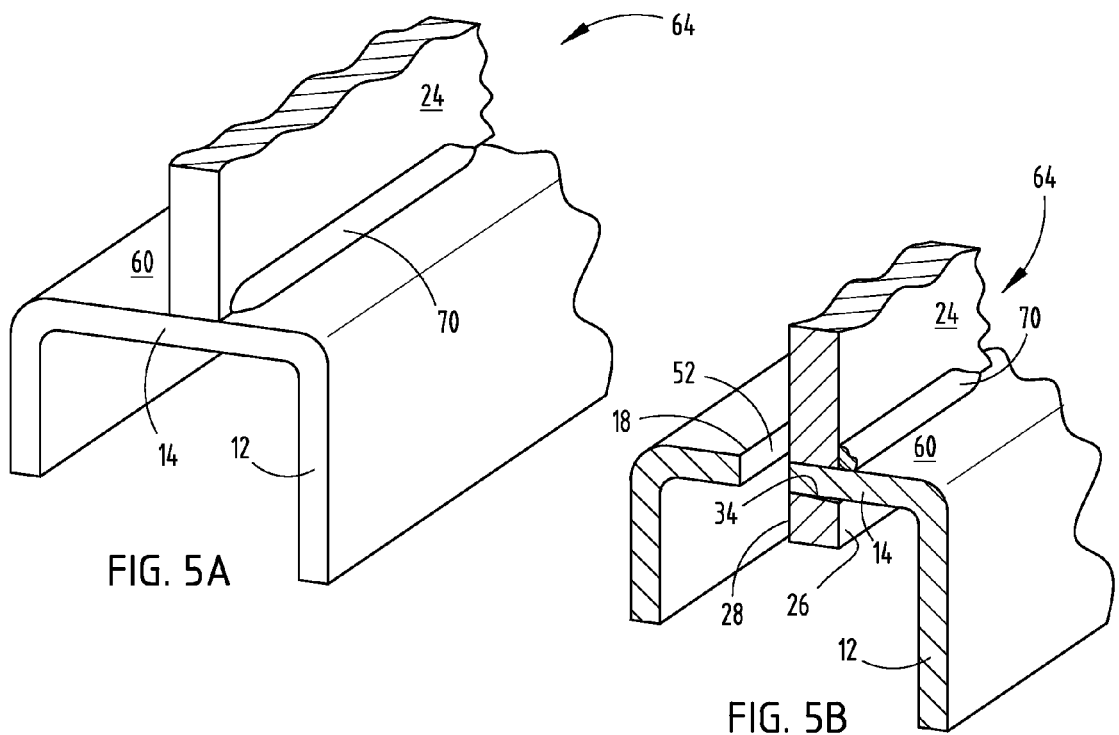
FIG. 5A
FIG. 5B
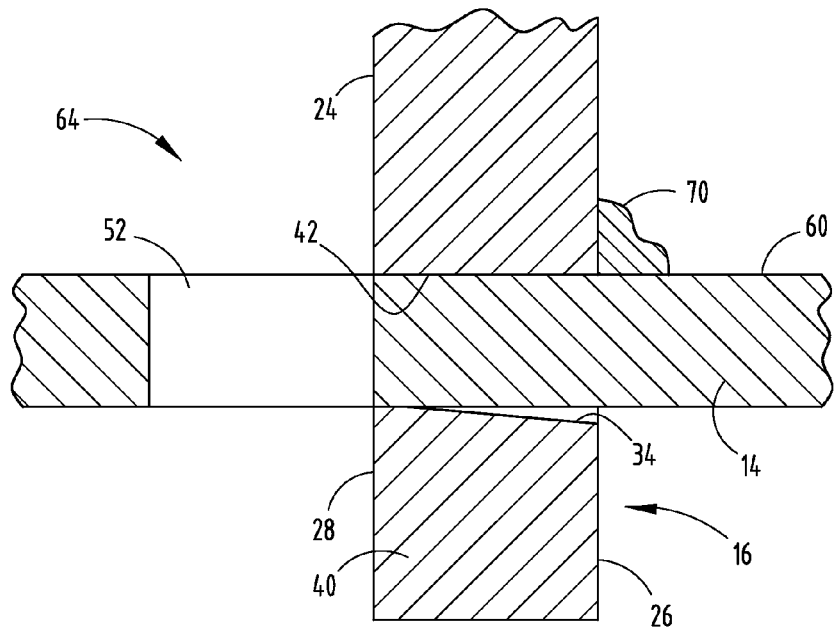
FIG. 5C

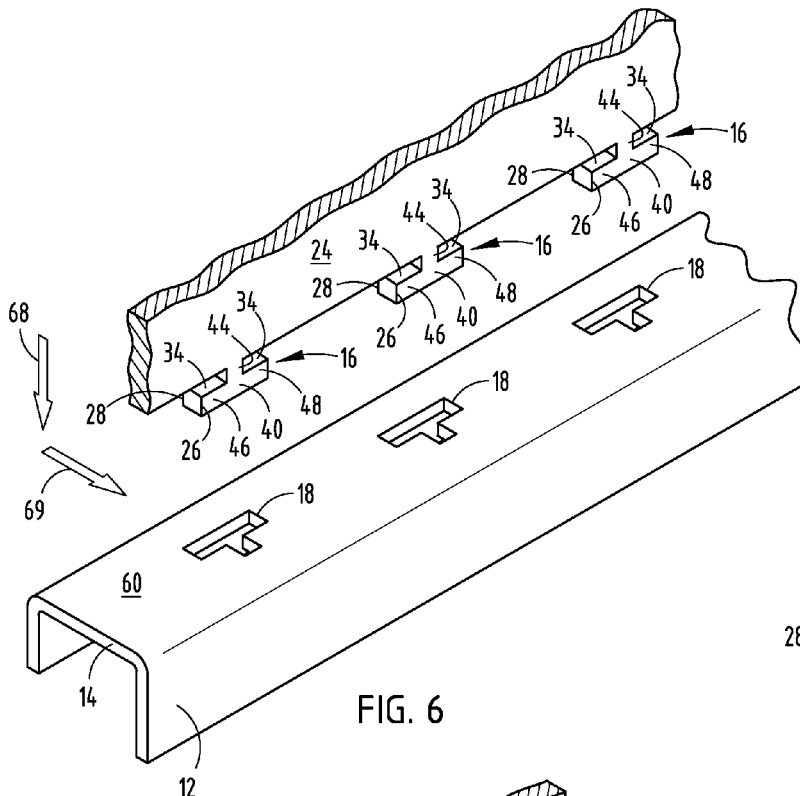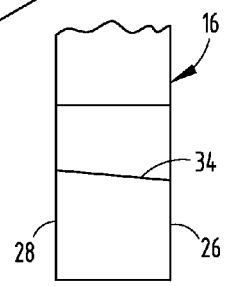
FIG. 6    FIG. 6A
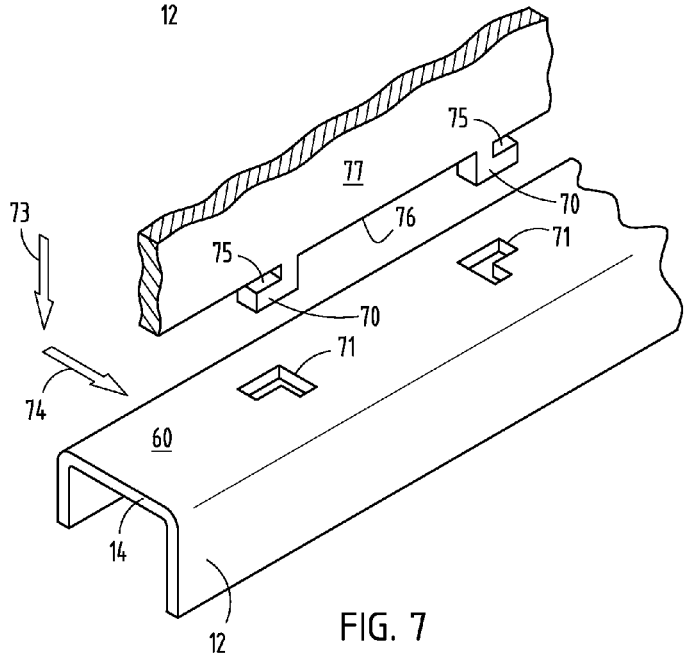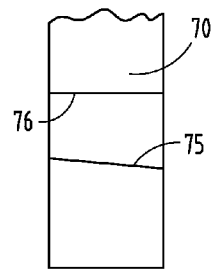
FIG. 7    FIG. 7A

US 8,702,053 B2

VEHICLE SEAT INTERFACE ASSEMBLY

FIELD OF THE INVENTION

The present invention generally relates to a vehicle seat interface assembly, and more specifically to a vehicle seat interface assembly that improves manufacturing speed and lessens interface inconsistency between engaging seat assembly parts.

BACKGROUND OF THE PRESENT INVENTION

Vehicle seat systems are traditionally mechanically fastened or welded to vehicles. These systems generally include tracks and slides that allow fore and aft translation of the vehicle seat.

SUMMARY OF THE PRESENT INVENTION

One aspect of the present invention includes a vehicle seat interface assembly having a track including a web having a substantially uniform thickness and one of a key and a key slot. A seat bracket is operably connected with a vehicle seat. The seat bracket includes a support that has the other of the key and the key slot disposed thereon. The key includes first and second side portions. The space defined between the first side portion and the support is greater than the thickness of the web. The space defined between the second side portion and the support is less than the thickness of the web, such that the key may be inserted into the key slot and laterally translated until the web is frictionally secured between the second side portion and the support.

Another aspect of the present invention includes a vehicle seat interface assembly having a track including a web having a key slot and a vehicle seat. A seat bracket is connected with the vehicle seat and includes a key. The key includes a tapered side such that lateral translation of the key inside the key slot in a direction perpendicular to the longitudinal extent of the track frictionally secures the web between the key and the seat bracket.

Another aspect of the present invention includes a vehicle seat interface assembly having a track including a web having a key slot and a vehicle seat. A seat bracket is connected with the vehicle seat and includes a key. The key includes at least one horizontal tab having a tapered side such that translation of the key inside the key slot from an inserted position to an engaged position frictionally secures the web between the key and the seat bracket.

These and other aspects, objects, and features of the present invention will be understood and appreciated by those skilled in the art upon studying the following specification, claims, and appended drawings.

BRIEF DESCRIPTION OF THE DRAWINGS

FIG. 3A is a partial top perspective view of a track and support prior to engagement;

FIG. 3B is a partial top cross-sectional perspective view of the track and support of FIG. 3A;

FIG. 3C is a partial side elevational view of a key member of the support of FIG. 3A;

FIG. 3D is a partial side cross-sectional elevational view of the track and support of FIG. 3A;

FIG. 4A is a partial side perspective view of the track and support during engagement;

FIG. 4B is a partial side cross-sectional perspective view of the track and support of FIG. 4A;

FIG. 4C is a partial side elevational cross-sectional view of the key and the key slot of FIG. 4A;

FIG. 5A is a partial side perspective view of the track and support after engagement;

FIG. 5B is a partial side cross-sectional perspective view of the track and support of FIG. 5A;

FIG. 5C is a partial side elevational cross-sectional view of the track and support of FIG. 5A;

FIG. 6 is a top perspective view of one embodiment of a track and support assembly including a plurality of keys and key slots;

FIG. 6A is a front elevational view of a key member of the support of FIG. 6;

FIG. 7 is a top perspective view of one embodiment of a track and support member prior to engagement;

FIG. 7A is a front elevational view of a key member of the support of FIG. 7;

DETAILED DESCRIPTION OF EMBODIMENTS

Figure 1:
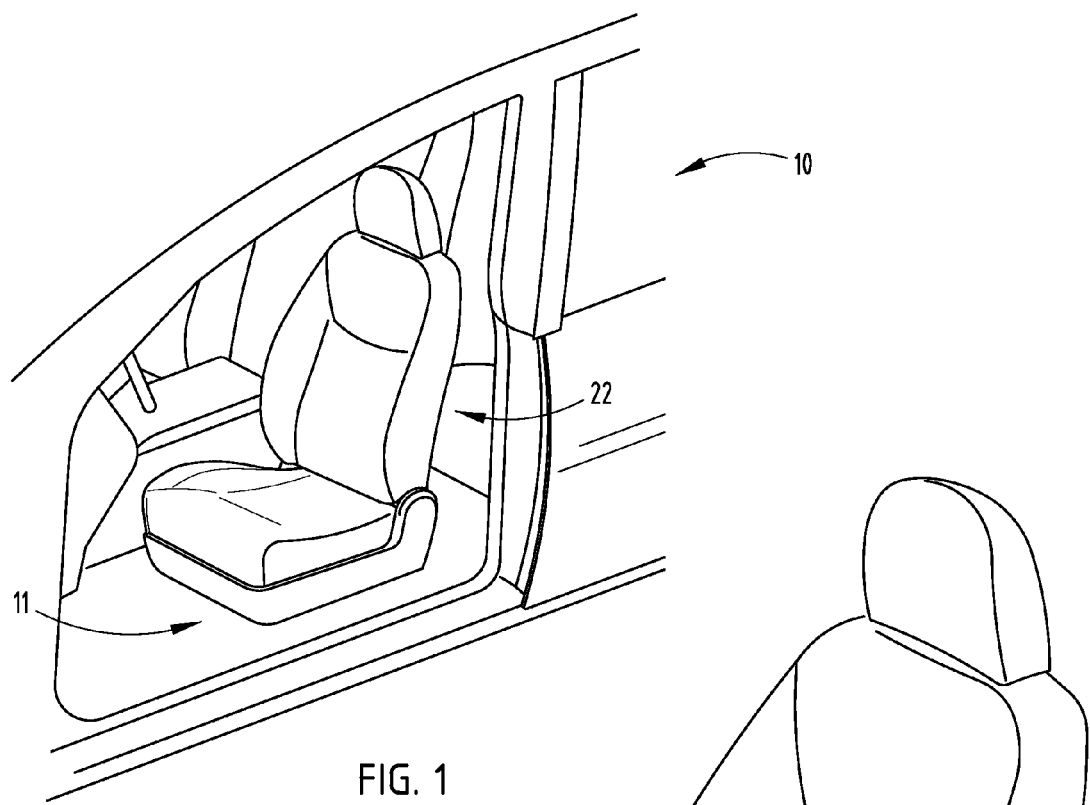
FIG. 1 is a top perspective view of a vehicle seat in a vehicle.
Figure 2:
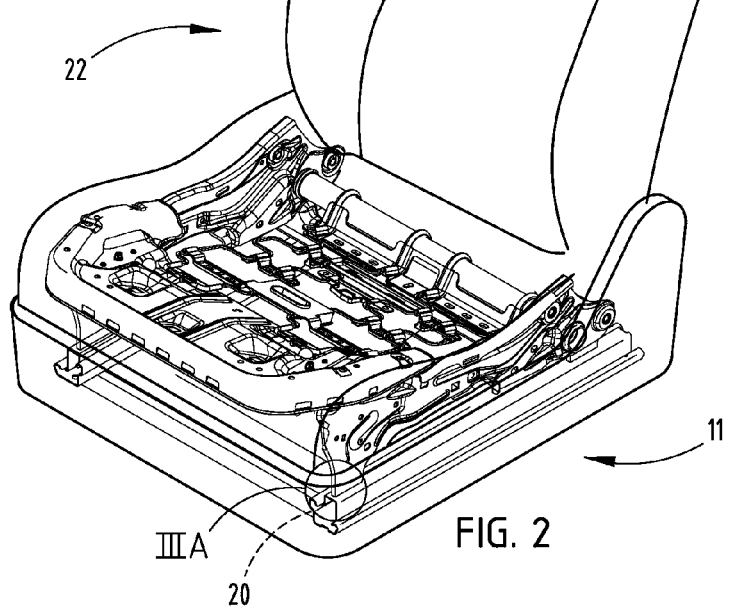
FIG. 2 is a top perspective view of one embodiment of a vehicle seat interface assembly of the vehicle seat of FIG. 1.
Figure 8:
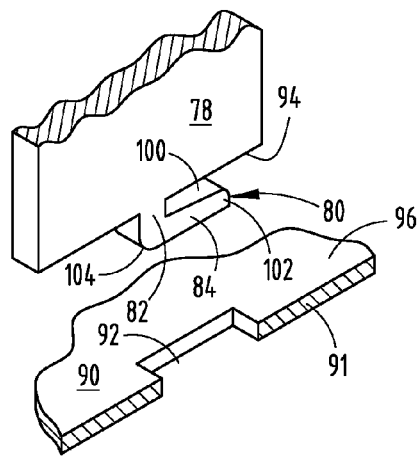
FIG. 8 is a top perspective view of another embodiment of a track and support of a vehicle seat interface assembly of the present invention.
Figure 9:
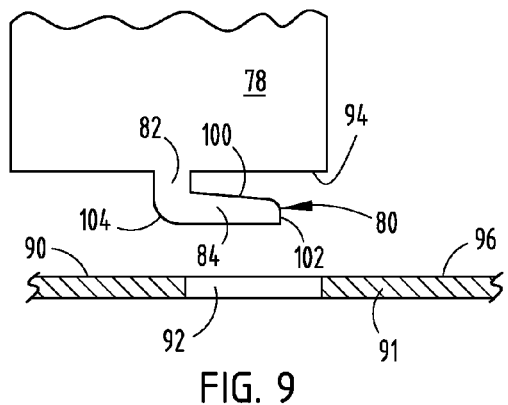
FIG. 9 is a side elevational view of the track and support of FIG. 8.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5C, the reference numeral 10 generally designates a vehicle having a vehicle seat interface assembly 11 with a track 12 including a web 14 that has a substantially uniform thickness and one of a key 16 and a key slot 18. A seat bracket 20 is operably connected with a vehicle seat 22. The seat bracket 20 includes a support 24 that has the other of the key 16 and the key slot 18 disposed thereon. The key 16 includes first and second side portions 26, 28. The size of a space $S_1$ defined between the first side portion 26 and the support 24 is greater than a thickness T of the web 14. A space $S_2$ defined between the second side portion 28 and the support 24 is less than the thickness T of the web 14, such that the key 16 may be inserted into the key slot 18 in the direction of arrow 30 and laterally translated in the direction of arrow 32 until the web 14 is frictionally secured between the second side portion 28 and the support 24.

Referring again to FIGS. 1 and 2, the vehicle seat interface assembly 11 is generally designed for use inside the vehicle 10. It is contemplated that the vehicle seat interface assembly 11 may be used to connect a forward seat or a rearward seat during the manufacturing of the vehicle 10. It will also be generally understood that the vehicle seat interface assembly 11 may be designed for use with passenger seats, driver seats, forward seats, and rearward seats.

Referring now to FIGS. 3A-3C, the key 16 includes a generally T-shaped construction with a tapered top surface 34. The T-shaped construction of the key 16 includes an enlarged laterally extending engagement portion 40 that is connected to a bottom side 42 of the support 24 by a vertically oriented connecting portion 44. The engagement portion 40 is larger than the connecting portion 44. It is generally contemplated that the key 16 may also include an L-shaped construction, or a variety of other constructions, that may serve generally the same purpose as the T-shaped construction disclosed and illustrated in FIGS. 3A-3C. Several of these different constructions are disclosed herein with reference to FIGS. 8-19. The engagement portion 40 of the key 16 includes a forward tab 46 and a rearward tab 48, each of which extends laterally parallel with the bottom side 42 of the support 24. The forward tab 46 and the rearward tab 48 generally define a tab space 50 between the tapered top surface 34 of each of the forward tab 46 and the rearward tab 48 and the bottom side 42 of the support 24. The tab space 50 is generally tapered. More specifically, the tab space 50 is tapered because the space $S_1$ defined between the first side portion 26 and the support 24 is greater than the space $S_2$ defined between the second side portion 28 and the support 24. The irregularly shaped tab space 50 allows for a frictional interface of the support 24 with the web 14 of the track 12 when the support 24 is adjusted laterally in the track 12, as will be disclosed in further detail below.

Referring again to FIGS. 3A-3D, the illustrated embodiment depicts the support 24 of the seat bracket 20 prior to engagement with the web 14 of the track 12. Prior to engagement of the support 24 of the seat bracket 20 with the track 12, the key slot 18 is aligned with the key 16. The key slot 18 includes a wide portion 52 and a narrow portion 54. The laterally extending engagement portion 40 of the key 16 is generally aligned with the wide portion 52 of the key slot 18 until the bottom side 42 of the support 24 abuts a top surface 60 of the track 12. In an inserted position 62 (FIG. 4A), the engagement portion 40 of the key 16 is substantially fully inserted into the key slot 18 and disposed below the web 14 of the track 12 (FIG. 4C), but not yet frictionally engaged.

As shown in FIGS. 3C and 4C, the space $S_2$ defined between the second side portion 28 and the support 24 is less than the thickness T of the web 14. Notably, the space $S_1$ defined between the first side portion 26 and the support 24 is greater than the thickness T of the web 14. Accordingly, after complete insertion of the key 16 into the key slot 18, the support 24 and the seat bracket 20 can be moved laterally in the direction of arrow 32. The vehicle seat 22 can be moved in this direction until the second side portion 28 and the support 24 frictionally engage the web 14, which, as noted above, is thicker than the space $S_2$ defined between the second side portion 28 and the support 24. Accordingly, the support 24 and the seat bracket 20 are in an engaged position 64 and are frictionally secured with the web 14 of the track 12. To maintain the seat bracket 20 and the support 24 in position, the interface of the key 16 with the key slot 18 in the track 12 includes a laser weld 70 (FIG. 5A), which secures the seat bracket 20 in place on the track 12.

Referring now to FIGS. 6 and 7, it is contemplated that a multitude of keys 16 and key slots 18 may be arranged along the support 24 and the track 12, depending on the required frictional engagement necessary to maintain the vehicle seat 22 in position during manufacturing. The forward tab 46 and rearward tab 48 of each key 16 frictionally engage the track 12, thereby securing the support 24 with the track 12. As discussed in detail above, the keys 16 are first inserted vertically in the direction of arrow 68 and then moved laterally in the direction of arrow 69.

Alternatively, as shown in the embodiment of FIG. 7, the key 16 may include only a single tab 70 that extends downwardly from a bottom surface 76 of a support 77. It is contemplated that the tab 70 may extend in an inward direction or an outward direction (as shown in FIG. 7). The connection and engagement of the vehicle seat 22 with the track 12 is performed in generally the same manner as that disclosed in detail above. However, the single tab 70 engages a key slot 71 having an L-shaped construction. The key slot 71 extends through the web 14 of the track 12. The single tab 70 includes a tapered top surface 75 that is designed for engagement with the web 14 of the track 12. The single tab 70 is inserted vertically in the direction of arrow 73 and then moved laterally in the direction of arrow 74 until the tapered top surface 75 and the bottom surface 76 frictionally engage the web 14 of the track 12.

Figure 10:
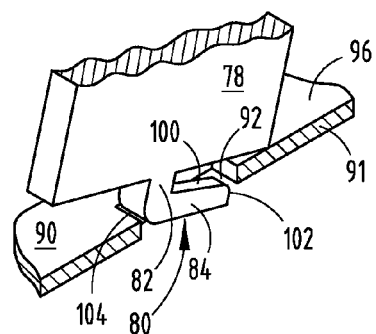
FIG. 10 is a top perspective view of the track and support of FIG. 8 during engagement.
Figure 11:
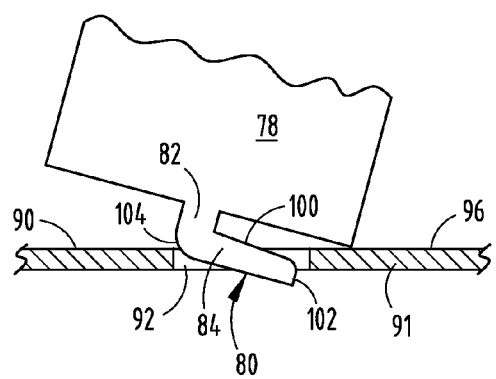
FIG. 11 is a side elevational view of the track and support of FIG. 8 during engagement.
Figure 12:
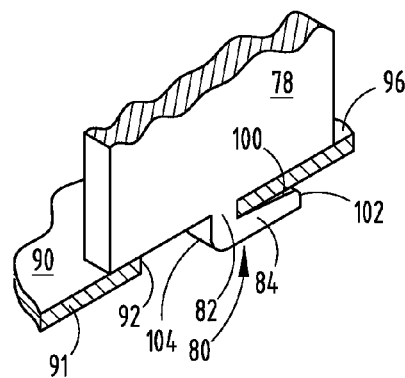
FIG. 12 is a top perspective view of the track and support of FIG. 8 after engagement.
Figure 13:
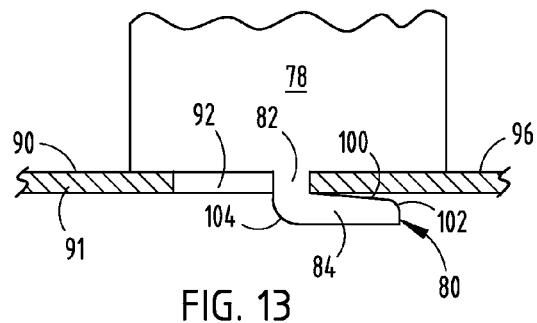
FIG. 13 is a side elevational view of the track and support of FIG. 8 after engagement.

Referring now to FIGS. 8-13, in another embodiment, a support 78 is connected to the vehicle seat 22 and has a key 80 that includes a connecting portion 82 and an engagement portion 84, wherein the engagement portion 84 defines a tab that extends laterally from the connecting portion 82. A track 90 is provided that includes a web 91 and a single elongate slot 92. To affect engagement of the support 78 with the track 90, the support 78 is inserted into the slot 92, as shown in FIGS. 10 and 11, such that the single laterally extending tab 84 protrudes into the slot 92. A bottom surface 94 of the support 78 is then placed in abutting engagement with a top surface 96 of the track 90 and the support 78 is moved laterally relative to the track 90. Consequently, a tab space 100 defined between the laterally extending tab 84 and the bottom surface 94 of the support 78 receives the web 91 of the track 90. The tab space 100 defined between the laterally extending tab 84 and the bottom surface 94 of the support 78 is greater at a distal end 102 of the tab 84 than at a proximal end 104 of the tab 84 close to the connecting portion 82 of the key 80. Accordingly, as the web 91 approaches the connecting portion 82 of the key 80, the web 91 is frictionally engaged between the tab 84 and the bottom surface 94 of the support 78. The key 80 is then held in place by friction until the support 78 is laser-welded to the track 90.

Figure 14:
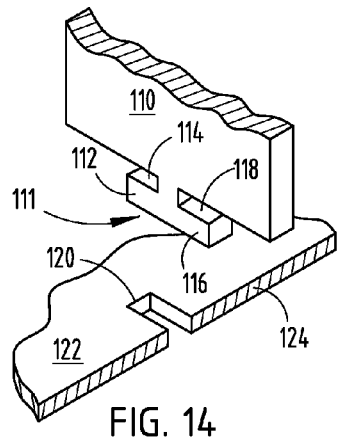
FIG. 14 is a top perspective view of yet another embodiment of a track and support of a vehicle seat interface assembly of the present invention.
Figure 15:
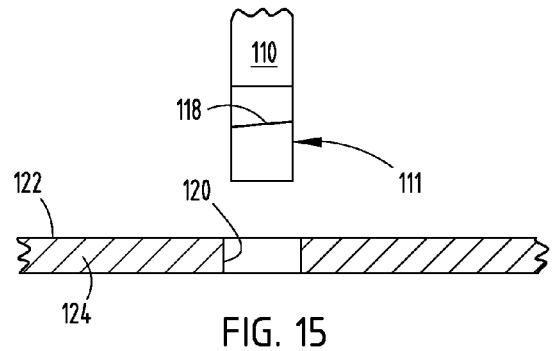
FIG. 15 is a side elevational view of a forward tab of the support of FIG. 14.
Figure 16:
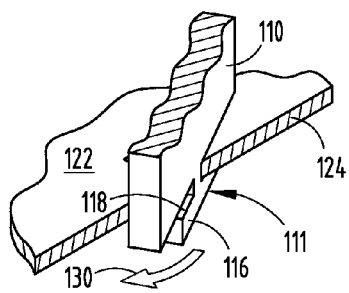
FIG. 16 is a top perspective view of the track and support of FIG. 14 during engagement.
Figure 17:
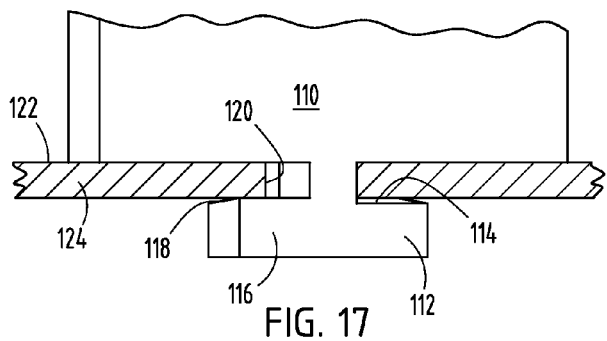
FIG. 17 is a side elevational view of the track and support of FIG. 14 during engagement.
Figure 18:
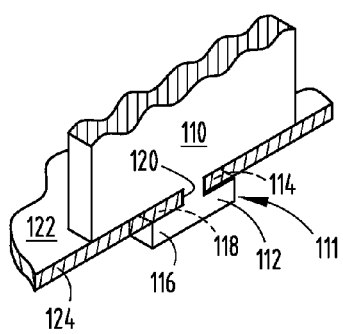
FIG. 18 is a top perspective view of the track and support of FIG. 14 after engagement.
Figure 19:
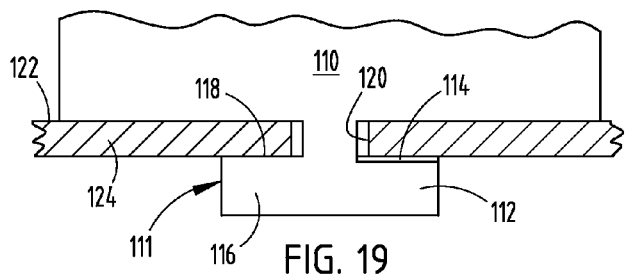
FIG. 19 is a side elevational view of the track and support of FIG. 14 after engagement.
Figure 20A:
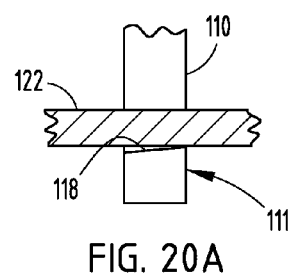
FIG. 20A is a side elevational view of a forward tab of the track and support of FIG. 14 after engagement.
Figure 20B:
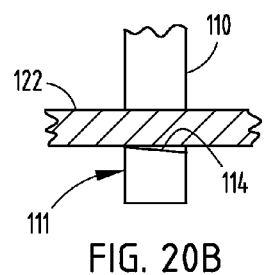
FIG. 20B is a side elevational view of a rearward tab of the track and support of FIG. 14 after engagement.

In yet another embodiment, as shown in FIGS. 14-20B, a support 110 is connected to the vehicle seat 22 and includes a key 111. However, the key 111 includes a forward tab 112 with a top surface 114 that is tapered in a first direction and a rearward tab 116 with a top surface 118 that is tapered in a second direction opposite the first direction (FIGS. 15 and 15A). The key 111 is adapted for insertion into an elongate slot 120, as shown in FIG. 14. After the key 111 is inserted into the elongate slot 120, the key 111 and support 110 are rotated approximately 90 degrees in the direction of arrow 130 (FIGS. 16 and 17) until the forward tab 112 and rearward tab 116 of the key 111 begin to engage a web 124 of a track 122 (as shown in FIGS. 18 and 19). As the support 110 rotates, the top surface 114 of the forward tab 112 frictionally engages the web 122 of the track 124 (FIG. 20A). At the same time, the top surface 118 of the rearward tab 116 frictionally engages the web 122 of the track 124 (FIG. 20B). Rotation of the support 110 approximately 90 degrees secures the web 122 of the track 124 between support 110 and the key 111. After secure engagement of the track 124 with the support 110, the track 124 and the support 110 can be welded together.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat interface assembly comprising:
   a track including a web having a substantially uniform thickness and one of a key and a key slot;
   a seat bracket operably connected with a vehicle seat, the seat bracket including a support that includes the other of the key and the key slot disposed thereon, wherein the key includes first and second side portions, and wherein a space defined between the first side portion and the support is greater than the thickness of the web and a space defined between the second side portion and the support is less than the thickness of the web, such that the key may be inserted into the key slot and laterally translated until the web is frictionally secured between the second side portion and the support.

2. The vehicle seat interface assembly of claim 1, wherein an interface of the seat bracket and the web is welded.

3. The vehicle seat interface assembly of claim 1, wherein the key includes a generally T-shaped construction with a tapered top side.

4. The vehicle seat interface assembly of claim 3, wherein the tapered top side angles downward at an angle between 0.1 degrees and 1.0 degrees.

5. The vehicle seat interface assembly of claim 1, wherein the key slot includes a connecting portion and an engagement portion, and wherein the engagement portion is larger than the connecting portion.

6. The vehicle seat interface assembly of claim 1, wherein the key includes a forward tab and a rearward tab.

7. The vehicle seat interface assembly of claim 6, wherein the forward tab and the rearward tab define a tab space.

8. A vehicle seat interface assembly comprising:
   a track including a web having a key slot;
   a vehicle seat; and
   a seat bracket connected with the vehicle seat and including a key, wherein the key includes a tapered side such that lateral translation of the key inside the key slot in a direction perpendicular to the longitudinal extent of the track frictionally secures the web between the key and the seat bracket.

9. The vehicle seat interface assembly of claim 8, wherein an interface of the seat bracket and the web is welded together.

10. The vehicle seat interface assembly of claim 8, wherein the key includes a generally T-shaped construction with a tapered top side.

11. The vehicle seat interface assembly of claim 10, wherein the tapered top side angles downward at an angle between 0.1 degrees and 1.0 degrees.

12. The vehicle seat interface assembly of claim 8, wherein the key slot includes a connecting portion and an engagement portion, and wherein the connecting portion is larger than the engagement portion.

13. The vehicle seat interface assembly of claim 8, wherein the key includes first and second tabs.

14. The vehicle seat interface assembly of claim 13, wherein the first and second tabs define a tab space disposed therebetween.

15. A vehicle seat interface assembly comprising:
   a track including a web having a key slot;
   a vehicle seat; and
   a seat bracket connected with the vehicle seat and including a key, wherein the key includes at least one horizontal tab having a tapered side such that translation of the key inside the key slot from an inserted position to an engaged position frictionally secures the web between the key and the seat bracket.

16. The vehicle seat interface assembly of claim 15, wherein an interface of the seat bracket and the web is welded together.

17. The vehicle seat interface assembly of claim 15, wherein the key includes a generally T-shaped construction with a tapered top side.

18. The vehicle seat interface assembly of claim 15, wherein the key includes a tapered top side that angles downward at an angle between 0.1 degrees and 1.0 degrees.

19. The vehicle seat interface assembly of claim 15, wherein the key is rotated inside the key slot from the inserted position to the engaged position.

* * * * *